(12) United States Patent
Noor

(10) Patent No.: US 10,346,409 B2
(45) Date of Patent: Jul. 9, 2019

(54) MULTI-FACETED METADATA STORAGE

(71) Applicant: Microsoft Technology Licensing, LLC, Redmond, WA (US)

(72) Inventor: David Noor, Redmond, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 0 days.

(21) Appl. No.: 14/664,990

(22) Filed: Mar. 23, 2015

(65) Prior Publication Data

US 2015/0205839 A1    Jul. 23, 2015

Related U.S. Application Data

(63) Continuation of application No. 12/813,523, filed on Jun. 11, 2010, now Pat. No. 8,990,167.

(51) Int. Cl.
*G06F 17/30* (2006.01)
*G06F 16/2457* (2019.01)
*G06F 16/21* (2019.01)
*G06F 16/2458* (2019.01)

(52) U.S. Cl.
CPC ...... *G06F 16/24573* (2019.01); *G06F 16/211* (2019.01); *G06F 16/2477* (2019.01)

(58) Field of Classification Search
USPC ........ 707/609, 687, 709, 750, 769, 818, 821
See application file for complete search history.

(56) References Cited

U.S. PATENT DOCUMENTS

| | | | |
|---|---|---|---|
| 2003/0149746 A1* | 8/2003 | Baldwin | G06F 16/95 709/219 |
| 2004/0003132 A1* | 1/2004 | Stanley | G06F 16/20 719/316 |
| 2011/0153645 A1* | 6/2011 | Hoover | G06Q 30/02 707/769 |

* cited by examiner

*Primary Examiner* — Sana A Al-Hashemi
(74) *Attorney, Agent, or Firm* — Workman Nydegger

(57) ABSTRACT

A system and method for storing and providing metadata. Metadata may be retrieved from multiple sources. The metadata is stored in facets in a repository and tagged to indicate one or more of the source, a time frame, or an associated data object. In response to receiving a request for metadata, a system selects metadata based on the specified object, source, or time frame. Access permissions corresponding to the requester are used to select and provide metadata for which the requester has permissions.

14 Claims, 8 Drawing Sheets

MULTI-FACETED METADATA STORAGE

BACKGROUND

In a computer system, data may be stored in or retrieved from a variety of data stores or processes. Data may flow among the data stores or processes, undergo transformations, and be copied or moved multiple times. Data lineage describes the origin, transformations, intermediate and end point destinations of data as it is moved and processed in a computer system. Metadata describes the various data objects. Metadata associated with a data object may describe sources, transformations, and intermediate or end point destinations. Metadata may describe various data stores or processes, such as servers, tables, or columns of tables. Examples of metadata describing servers include server host names, type of servers, dependencies or other relationships between servers or attributes of servers. Examples of metadata describing data include table definitions, column definitions, report definitions, table structures, and the locations of tables.

Metadata may be used to determine data lineage of various data. The data lineage may be used to document or audit data, or for other uses. A data impact analysis may use metadata or a data lineage to determine possible impacts of changes to the data system. This may be useful in planning system modifications or in various other data management tasks. For example, an impact analysis may assist an administrator desiring to change the type of a table column, by indicating the impacts of data in the system. An impact analysis and lineage service is a service that performs retrieval and analysis of metadata to facilitate viewing data lineage or performing an impact analysis.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Briefly, a system, method, and components operate to store metadata items corresponding to multiple data objects, and to provide the metadata items in response to received requests. An embodiment includes receiving, from each of multiple sources, a corresponding set of metadata items, storing each metadata item as a facet in a repository, and tagging each facet with an identifier of a source corresponding to the facet and a data object corresponding to the facet. An embodiment includes receiving, from a requester, a request for metadata, the request including a specification of a data object, and, in response to receiving the request, retrieving a response set of facets based on the specification of the data object and access permissions corresponding to the requester. An embodiment may also include providing the response set of facets to the requester.

In one embodiment, stored facets are tagged with a time frame corresponding to the facet. A request for metadata may include a specification of a time frame. In response, retrieval of a response set of facets may be based on the specification of the time frame.

In one embodiment, retrieving the response set of facets includes determining the response set based on a source corresponding to each facet and access permissions of the requester corresponding to each of the sources.

To the accomplishment of the foregoing and related ends, certain illustrative aspects of the system are described herein in connection with the following description and the annexed drawings. These aspects are indicative, however, of but a few of the various ways in which the principles of the invention may be employed and the present invention is intended to include all such aspects and their equivalents. Other advantages and novel features of the invention may become apparent from the following detailed description of the invention when considered in conjunction with the drawings.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

To assist in understanding the present invention, reference will be made to the following Detailed Description, which is to be read in association with the accompanying drawings, wherein.

DETAILED DESCRIPTION

Figure 1:
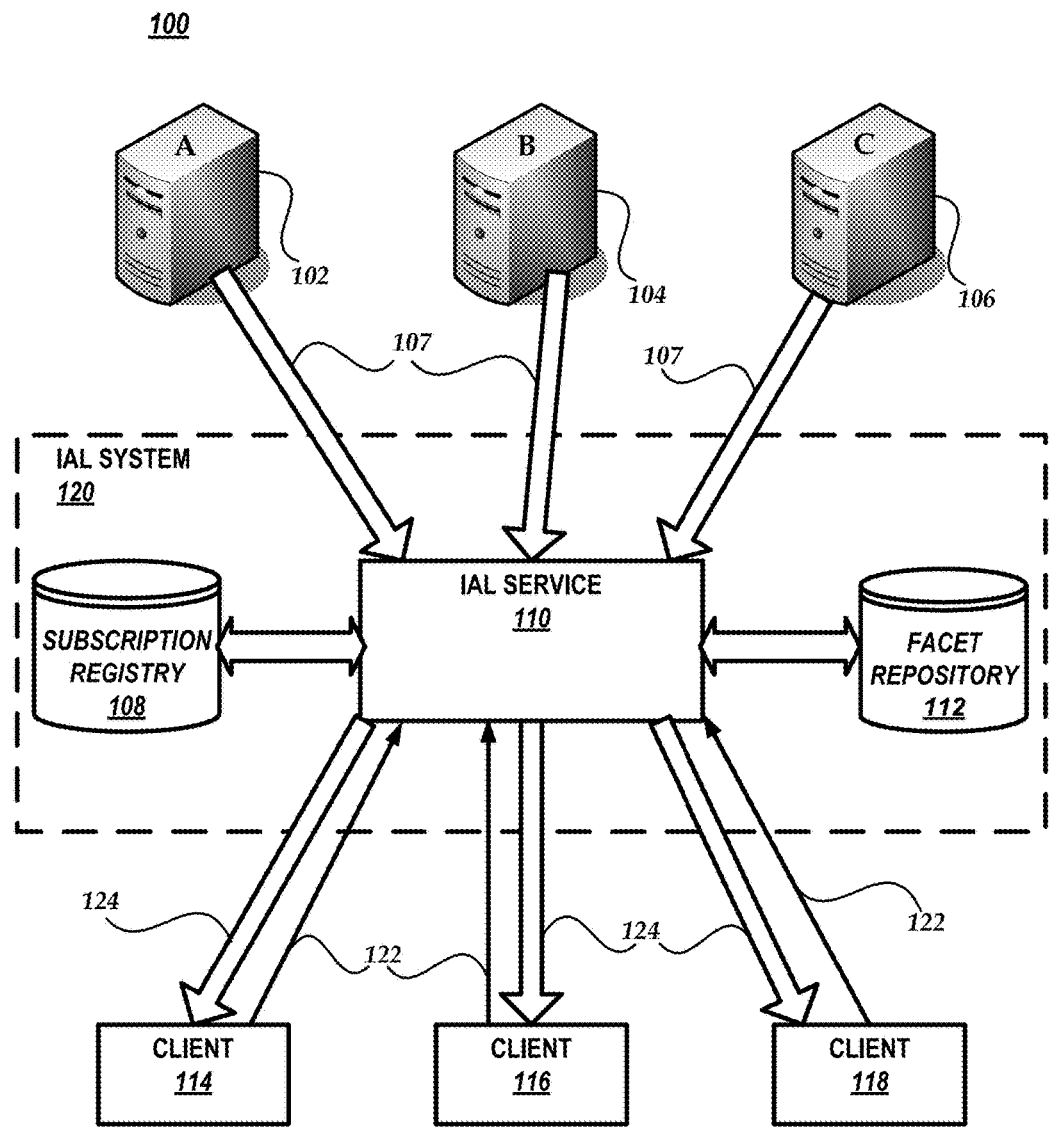
FIG. 1 is a block diagram of an environment in which mechanisms herein described may be practiced.

Example embodiments of the present invention now will be described more fully hereinafter with reference to the accompanying drawings, which form a part hereof, and which show, by way of illustration, specific example embodiments by which the invention may be practiced. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods or devices. Accordingly, the present invention may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to a previous embodiment, though it may. Furthermore, the phrase "in another embodiment" as used herein does not necessarily refer to a different embodiment, although it may. Thus, various embodiments of the invention may be readily combined, without departing from the scope or spirit of the invention. Similarly, the phrase "in one implementation" as used herein does not necessarily refer to the same implementation, though it may, and techniques of various implementations may be combined.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

The components described herein may execute from various computer-readable media having various data structures thereon. The components may communicate via local or remote processes such as in accordance with a signal having one or more data packets (e.g. data from one component interacting with another component in a local system, distributed system, or across a network such as the Internet with other systems via the signal). Software components may be stored, for example, on non-transitory computer-readable storage media including, but not limited to, an application specific integrated circuit (ASIC), compact disk (CD), digital versatile disk (DVD), random access memory (RAM), read only memory (ROM), floppy disk, hard disk, electrically erasable programmable read only memory (EEPROM), flash memory, or a memory stick in accordance with embodiments of the present invention.

The term computer-readable media as used herein includes both non-transitory storage media and communications media. Communications media typically embody computer-readable instructions, data structures, program modules, or other data in a modulated data signal such as a carrier wave or other transport mechanism and include any information-delivery media. By way of example, and not limitation, communications media include wired media, such as wired networks and direct-wired connections, and wireless media such as acoustic, radio, infrared, and other wireless media.

FIG. 1 is a block diagram of an environment 100 in which mechanisms herein described may be practiced. FIG. 1 provides a basic understanding of an example environment, though many configurations may be employed and many details are not illustrated in FIG. 1. As illustrated in FIG. 1, an example environment 100 includes server A 102, server B 104, and server C 106. Each of these servers may be a remote database server, a report server, or another type of server that provides metadata. Each of server A 102, server B 104, and server C 106 may provide metadata to impact analysis and lineage (IAL) service 110. Server A 102, server B 104, and server C 106 may additionally store, transform, or otherwise process data that is the subject of the metadata. The flow of metadata from each server to IAL service 110 is indicated by arrows 107.

In the illustrated embodiment, IAL service 110 receives metadata and stores it in facet repository 112. IAL service 110 may also retrieve stored metadata from facet repository 112 as part of processes that are discussed herein. In one embodiment, IAL service may retrieve subscription data from subscription registry 108. Subscription data includes data that indicates access rights of clients with respect to metadata. This may include access control lists (ACLs) or other types of information. In one embodiment, the subscription data indicates source servers for which each class of requester has access permissions.

In the illustrated embodiment, IAL service 110, subscription registry 108, and facet repository 112 make up IAL system 120. Though facet repository 112 and subscription registry 108 are each illustrated as a single database, each may be comprised of one or more databases or data repositories. The data of subscription registry 108 and facet repository 112 may be combined in a variety of ways. Each portion may be stored as a file, maintained in volatile memory, or stored using a variety of mechanisms. Each of subscription registry 108 or facet repository 112 may be implemented in any of a variety of ways, such as a relational database or other structured database, a flat file, one or more data structures in memory, a markup language, or any combination thereof.

Example environment 100 includes clients 114, 116, and 118. A client may be a person, a client computing device, a server, a process executing on a computing device, or a combination thereof. Each client may make requests for metadata, as indicated by request arrows 122. In response, IAL service 110 may process the requests and return metadata, as indicated by response arrows 124. IAL service 110 may retrieve access rights from subscription registry 108, retrieve requested metadata from facet repository 112, and send requested metadata to the requesting client. As discussed herein, IAL service 110 may determine the metadata to send in a response based on access rights, sources of metadata, a specified time period, or other factors.

Figure 8:
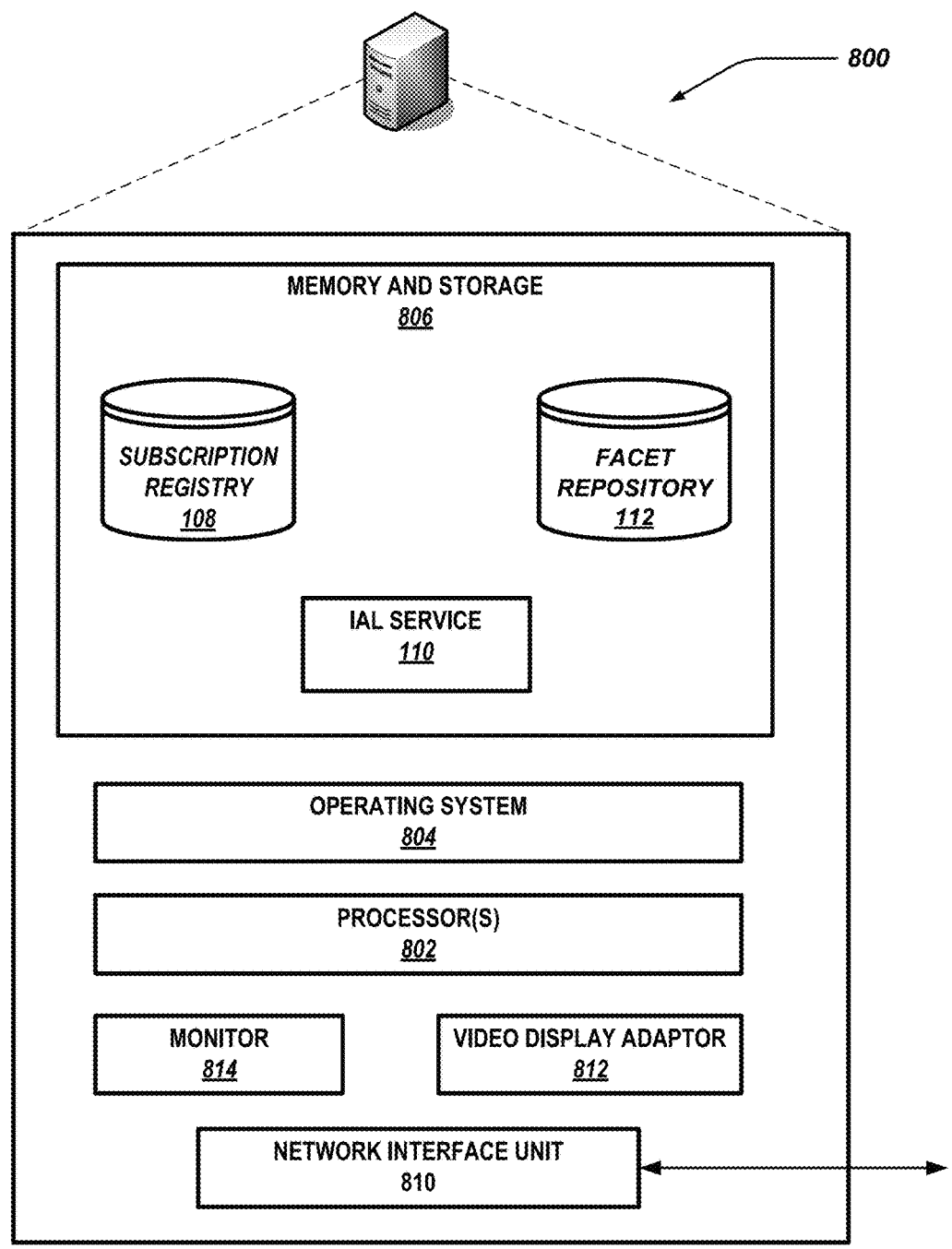
FIG. 8 shows one embodiment of a computing device, illustrating selected components of a computing device that may be used to perform functions described herein.

One or more computing devices may be used to implement IAL service 110. A computing device may be a special purpose or general purpose computing device. Example computing devices include mainframes, servers, blade servers, personal computers, portable computers, communication devices, consumer electronics, or the like. FIG. 8 illustrates an example embodiment of a computing device that may be used to implement IAL service 110.

Components illustrated in FIG. 1 may use any of a variety of mechanisms to communicate with each other. These mechanisms may include a direct connection, a local area network, a wide area network, or a combination thereof. Communication mechanisms may include wired communication mechanisms, wireless communication mechanisms, or a combination thereof. Communications between any of the components may employ one or more of various wired or wireless communication protocols, such as IP, TCP/IP, UDP, HTTP, SSL, TLS, FTP, SMTP, WAP, Bluetooth, or WLAN.

Figure 2:
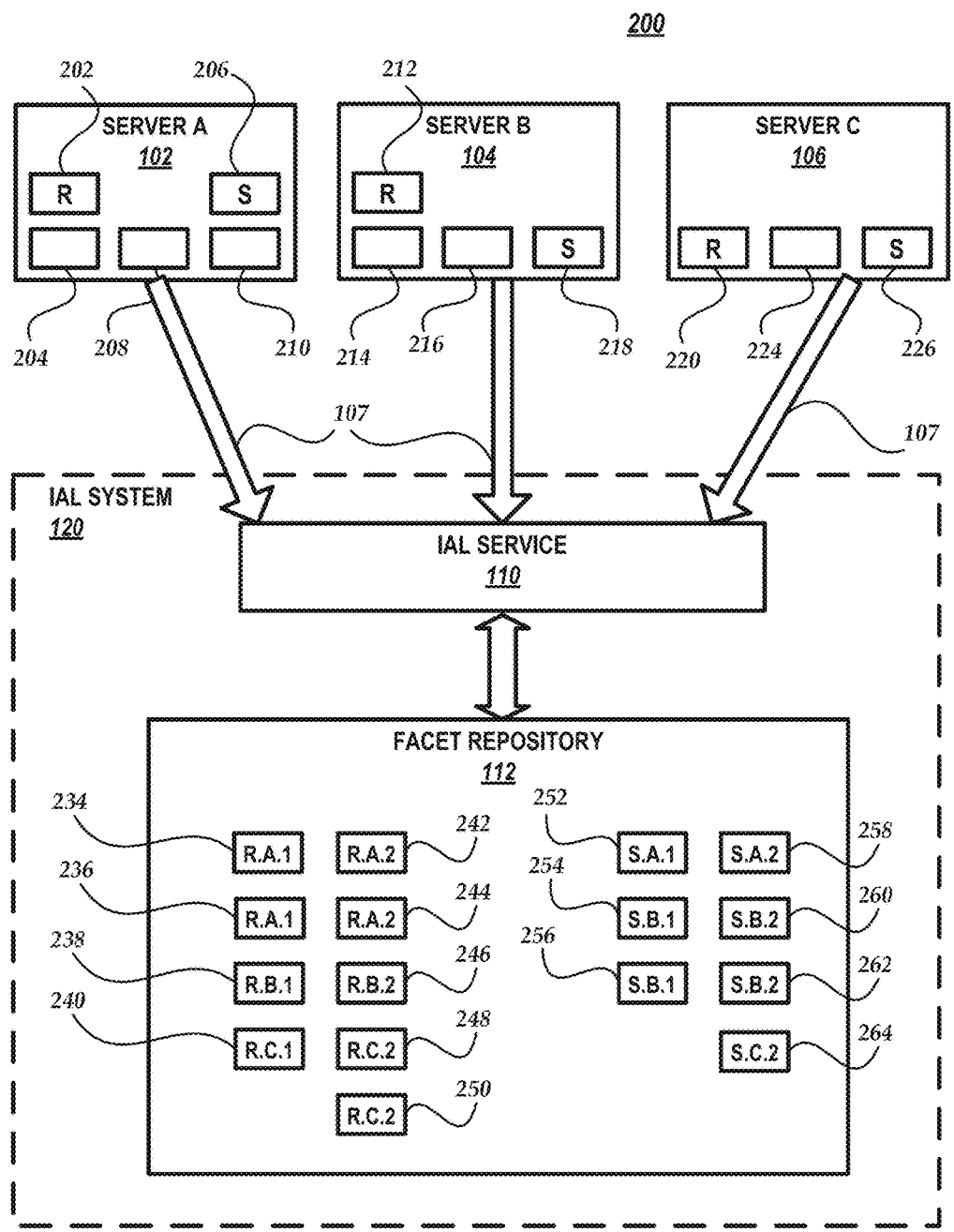
FIG. 2 is a block diagram of an example computer subsystem for retrieving and storing metadata, in which mechanisms described herein may be implemented.

FIG. 2 is a block diagram of an example computer subsystem 200 for retrieving and storing metadata, in which mechanisms described herein may be implemented. FIG. 2 is only an example of a suitable system configuration and is not intended to suggest any limitation as to the scope of use or functionality of the present invention. Thus, a variety of system configurations may be employed without departing from the scope or spirit of the present invention.

Example subsystem 200 includes some of the components illustrated in FIG. 1 and described herein. These components include server A 102, server B 104, server C 106, IAL system 120, IAL service 110, and facet repository 112. As illustrated, server A 102 stores or processes data objects 202, 204, 206, 208, and 210. Data object 202 refers to object "R" and data object 206 refers to object "S." Server B stores or processes data objects 212, 214, 216, and 218. Data object 212 refers to object "R" and data object 218 refers to object "S." Server C 106 stores or processes data objects 220, 224, 226. Data object 220 refers to object "R" and data object 226 refers to object "S." The illustrated data objects are examples, and each server may have more or fewer data objects. A data object may be an entry in a data table, a data table itself, a column of data, a report, a report field, a cube, a cube measure, a collection of data objects, or any other form of data.

As illustrated by arrows 107, in one embodiment, IAL service 110 receives metadata from each of server A 102, server B 104, and server C 106, and stores the metadata in facet repository 112. In one embodiment, each item of metadata may be stored as a facet, in which a facet is tagged with the source of the metadata and a time frame corresponding to the metadata. Each facet may be tagged with, or organized by, the object that is described by the metadata. The time frame corresponding to each facet of metadata may indicate a time when the metadata accurately describes a corresponding data item. As used herein, the term "tag" refers to identification of data such that it may be retrieved by data retrieval mechanisms using the corresponding tag. For example, a metadata facet tagged with a source "A" and a time frame T1 may be retrieved by a query specifying source equal to "A" and time frame equal to T1.

In the example of FIG. 2, facet repository 112 is shown as including metadata facets 234-264. For purposes of illustration, these facets are arranged so that metadata facets 234-250 correspond to object R, though in various implementations, facets are not necessarily arranged by the object to which they correspond. Object R may be a data object, such as a table, column, or other type of data object. Facet repository 112 is also shown as including metadata facets 252-264, which correspond to object S. Each facet is shown with three tags. The first tag indicates the object to which the facet corresponds. In this example, the objects are "R" or "S." The second tag is an alphabetic tag indicating a source of the metadata. Tags A, B, and C correspond to server A 102, server B 104, and server C 106, respectively. Each facet is also shown with a numeric tag indicating a time frame of the metadata. Tags 1 and 2 indicate a time frame T1 and a time T2, respectively.

Thus, facets 234 and 236 indicate that they are metadata facets corresponding to object R and time frame T1, and are received from server A. Facet 238 is a metadata facet corresponding to object R and time frame T1, and is received from server B. Facet 240 is a metadata facet corresponding to object R and time frame T1, and is received from server C. Similarly, facets 242 and facet 244 are received from server A and correspond to time frame T2; facet 246 is received from server B and corresponds to time frame T2; facets 248 and 250 are received from server C and correspond to time frame T2.

Facets 252-264 are metadata facets corresponding to object S. Facets 252, 254, and 256 correspond to time frame T1; facets 258, 260, 262, and 264 correspond to time frame T2. Facets 252 and 258 are received from server A; facets 254, 256, 260, and 262 are received from server B; facet 264 is received from server C.

In the illustrated embodiment, the metadata is not stored based on access permissions. As illustrated in FIG. 2, in one embodiment, the metadata facets may be stored in a denormalized structure, in which an item of metadata may have multiple facets, each facet corresponding to a different data source. In the example facet repository 112 of FIG. 2, facets 234, 238, and 240 may each correspond to an item of metadata corresponding to data object "R." The facets correspond to server A, server B, and server C, respectively.

A time frame that a facet corresponds to may indicate a time frame in which the facet is received by IAL service 110. In some embodiments, it may indicate a time that the source of the metadata retrieved or extracted the metadata. For example, a source server may extract an item of metadata descriptive of an object and store it. At a subsequent time, the source server may provide the metadata and corresponding time to IAL service 110. A source server may thus provide a metadata history associated with an object. IAL service 110 may use the corresponding times to store facets, each facet being tagged with its source and corresponding time frame.

In one embodiment, each facet may have a corresponding access control list (ACL) that indicates requesters, or classes of requesters, that may access the facet. The ACLs for each facet may be used in a subsequent query to determine a set of facets that are to be sent in response.

Figure 3:
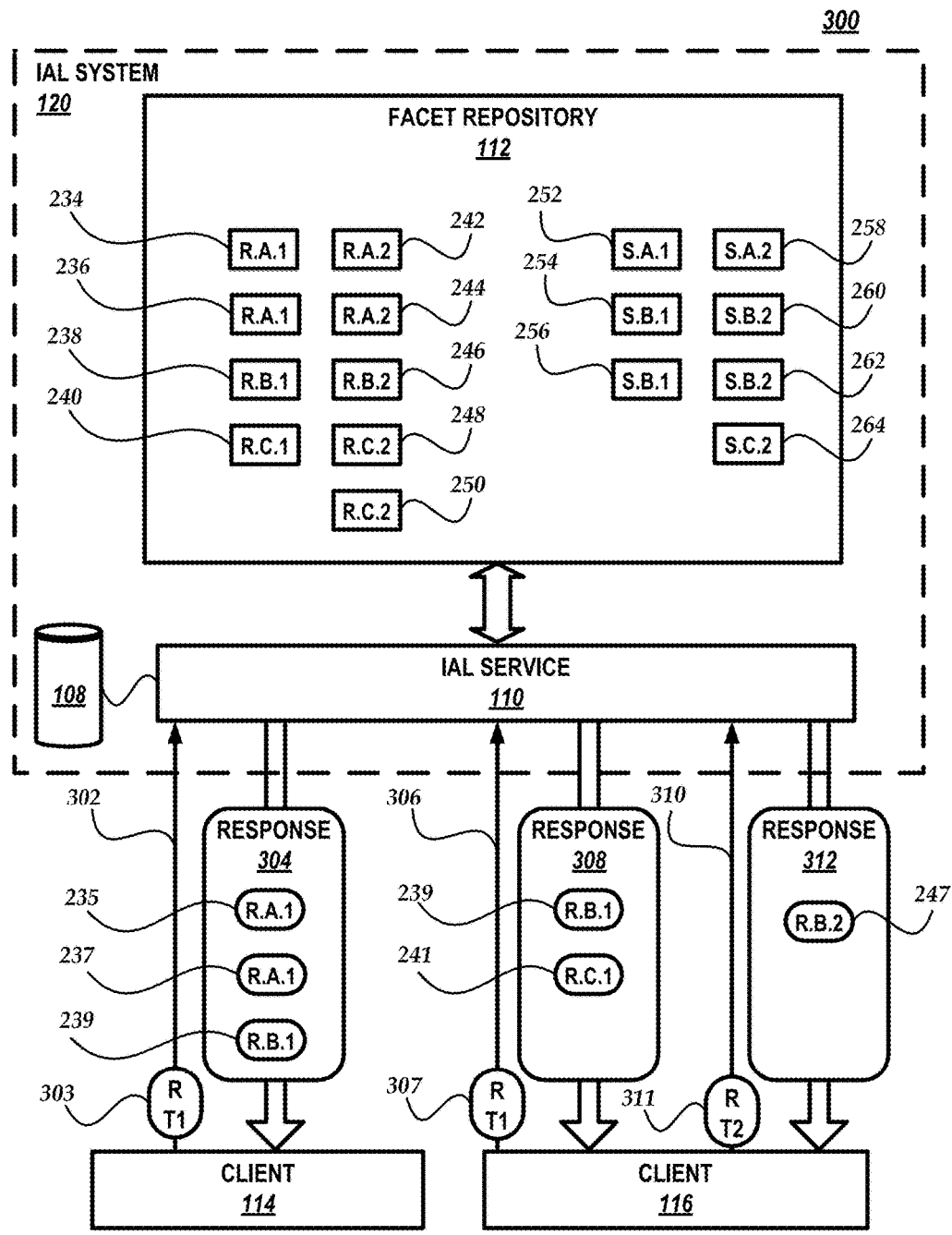
FIG. 3 is a block diagram of an example computer subsystem for providing metadata, in which mechanisms described herein may be implemented.

FIG. 3 is a block diagram of an example computer subsystem 300 for providing metadata, in which mechanisms described herein may be implemented. FIG. 3 is only an example of a suitable system configuration and is not intended to suggest any limitation as to the scope of use or functionality of the present invention. Thus, a variety of system configurations may be employed without departing from the scope or spirit of the present invention.

Figure 4:
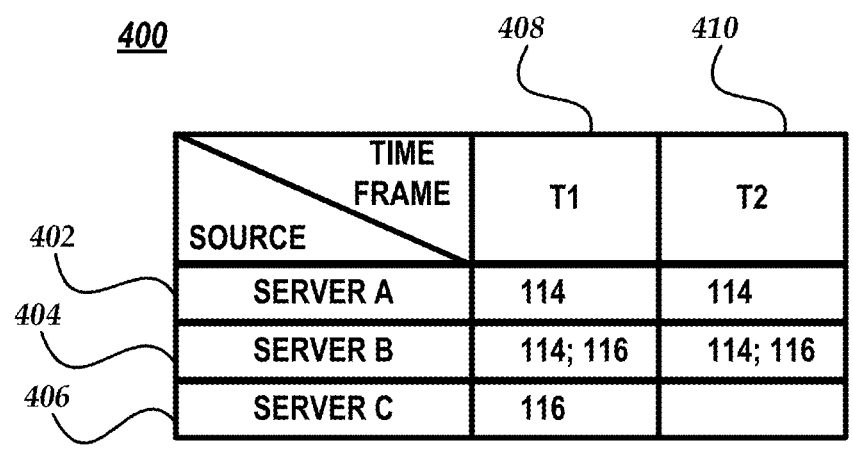
FIG. 4 illustrates an example access permissions table, showing an example configuration of access permissions for clients.

Example subsystem 300 includes some components illustrated in FIG. 1 or FIG. 2 and described herein. These components include IAL system 120, IAL service 110, facet repository 112, subscription registry 108, metadata facets 234-264, and clients 114 and 116. In the discussion that follows, reference is made to FIG. 4. FIG. 4 illustrates an example access permissions table 400, showing an example configuration of access permissions for clients 114 and 116. In access permissions table 400, rows 402, 404, and 406 correspond to server A, server B, and server C, respectively. Columns 408 and 410 correspond to time frames T1 and T2 respectively. Each cell indicates which clients have access permission for the combination of server and time frame.

Example subsystem 300 illustrates a mechanism in which client 114 or 116 may send a metadata request to IAL service 110. Request arrows 302, 306, and 310 represent example metadata requests. A request may specify criteria for retrieval of the desired metadata. In the illustrated example, client 114 sends a request that includes request specification 303 with a specification of object R and time frame T1.

In response to receiving this request, IAL service 110 may retrieve metadata facets that are associated with object R and time frame T1. IAL service 110 may additionally retrieve access permissions corresponding to requesting client 114 to determine metadata facets for which client 114 has permission to receive. In one embodiment, subscription registry 108 may store permission data for each client or class of clients. For example, IAL service 110 may retrieve from subscription registry 108 data to indicate a client class that client 114 belongs to. It may further retrieve permission data indicating to which of the requested metadata facets the client class has access permissions.

In the illustrated example, it may be seen that metadata facets 234, 236, 238, and 240 meet the specified criteria of request specification 303. However, as indicated by access permissions table 400, at time frame T1, client 114 has access permissions for server A and server B, but not server C. The set of sources for which a client has access permissions may be referred to as an accessible set of sources relative to the client and a time frame. Therefore, client 114 has access permissions for facets 234, 236, and 238, but not for facet 240. Thus, response 304 sent from IAL service 110 to client 114 includes the metadata stored in facets 234, 236, and 238. This metadata is shown as metadata items 235, 237, and 238, corresponding to facets 234, 236, and 238, respectively.

In the example of FIG. 3, client 116 sends a request, indicated by request arrow 306, which includes request specification 307, with a specification of object R and time frame T1. These specifications are identical to those of request specification 303 as discussed above. However, in this example, client 116 belongs to a client class that has different access permissions from that of client 114. As indicated in example access permissions table 400, at time frame T1, client 116 has access permissions for server B and server C, but not server A. Following a similar process for responding to this request as discussed for the request of client 114, IAL service 110 may determine that client 116 has access permissions for metadata facets 238 and 240, which meet the specified criteria. Thus, response 308 sent from IAL service 110 to client 116 includes metadata from facets 238 and 240. This is shown as metadata items 239 and 241 in response 308.

FIG. 3 includes another example request sent by client 116, as indicated by request arrow 310. This request includes request specification 311, with a specification of object R and time frame T2. Following a similar process as discussed above, IAL service 110 may determine that facets 242, 244, 246, 248, and 250 meet the specified criteria. In this example, IAL service 110 may further determine that of these facets, client 116 has access permissions only for facet 246. Thus, response 312 sent from IAL service 110 to client 116 in response to this request includes metadata from facet 246. This is shown as metadata item 247, corresponding to facet 246.

In this example, it is to be noted that client 116 has access permissions for servers B and C at time frame T1, but does not have access permissions for server C at time frame T2. In some embodiments, the access permissions of a client or client class may vary across different time frames.

FIG. 3 illustrates that in some embodiments, facet repository 112 may maintain a single copy of each metadata facet. A determination of access permissions may be performed with respect to each facet in response to a metadata request. Thus, in some embodiments, duplication of metadata facets in order to maintain multiple client views of the metadata may be avoided.

Figure 5:
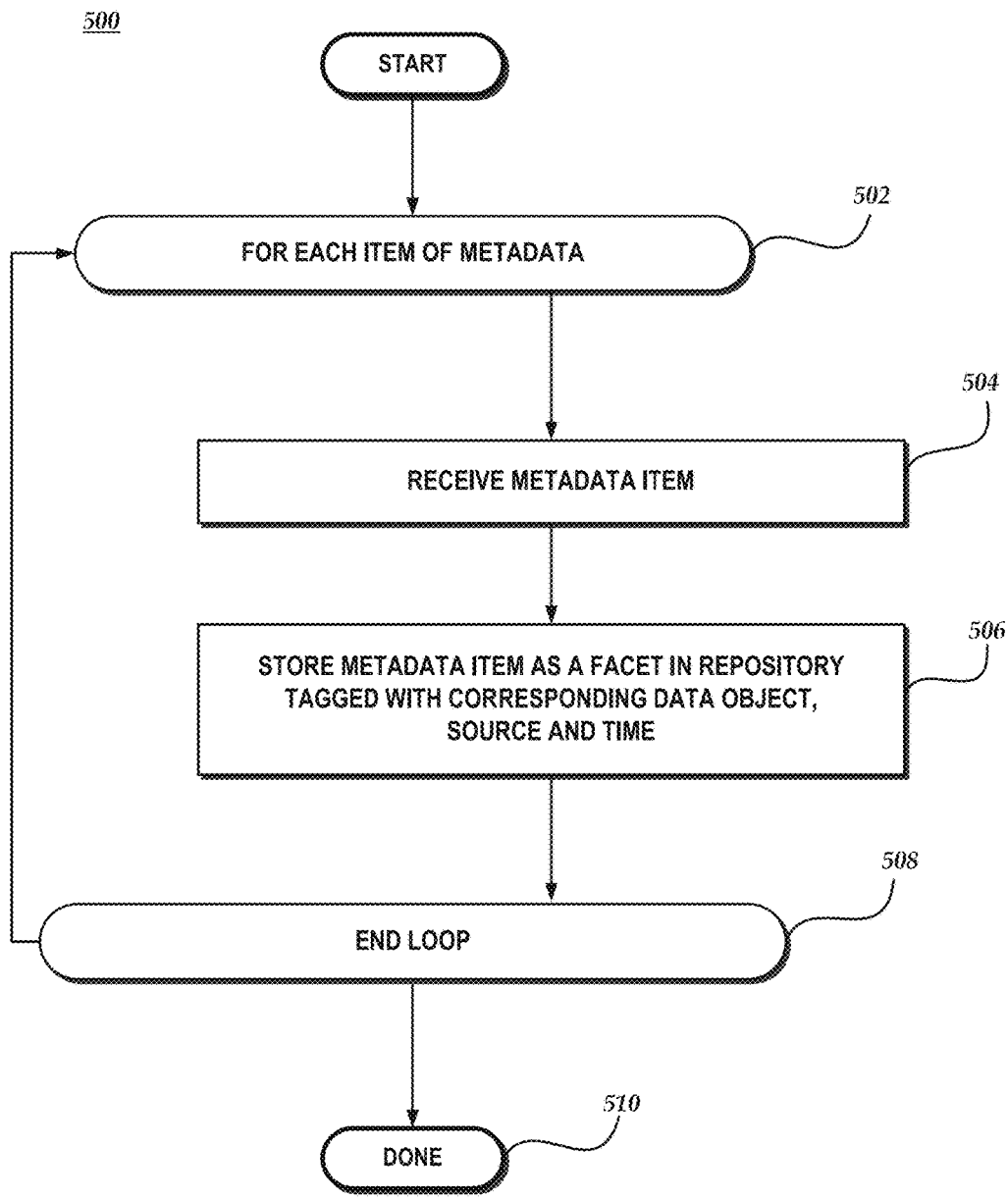
FIG. 5 is a flow diagram illustrating an example embodiment of a process of storing metadata facets.

FIG. 5 is a flow diagram illustrating an example embodiment of a process 500 of storing metadata facets. In one embodiment, at least some of the actions of process 500 are performed by components of computer subsystem 200 of FIG. 2.

The illustrated portions of process 500 may be initiated, after a start block, at loop 502, which iterates for each item of metadata processed by subsystem 200. In the illustrated embodiment, loop 502 includes blocks 504 and 506, and is terminated by block 508.

The process may flow to block 504, where a metadata item is received. As illustrated in FIG. 2, a metadata item may be received from any of a variety of sources, such as server A 102, server B 104, or server C 106.

The process may flow to block 506, where the received metadata item may be stored as a metadata facet in a repository, such as facet repository 112. The metadata facet may be tagged with an identification of the source, time frame, or data object corresponding to the metadata, or a combination thereof. FIG. 2 illustrates examples of tagged metadata facets in a repository. In some embodiments, storing the metadata facets is not based on access permissions and access permissions are not retrieved from subscription registry 108 as part of the facet storage process. As discussed herein, access permissions may be used during retrieval to determine responses to requests for metadata.

The process may flow to block 508 and selectively perform another iteration of loop 502, based on a system configuration or controlling actions by a user. In some embodiments, process 500 may pause while waiting for additional metadata input. Upon exiting loop 502, the process may flow to done block 510 and exit or return to a calling program.

Figure 6:
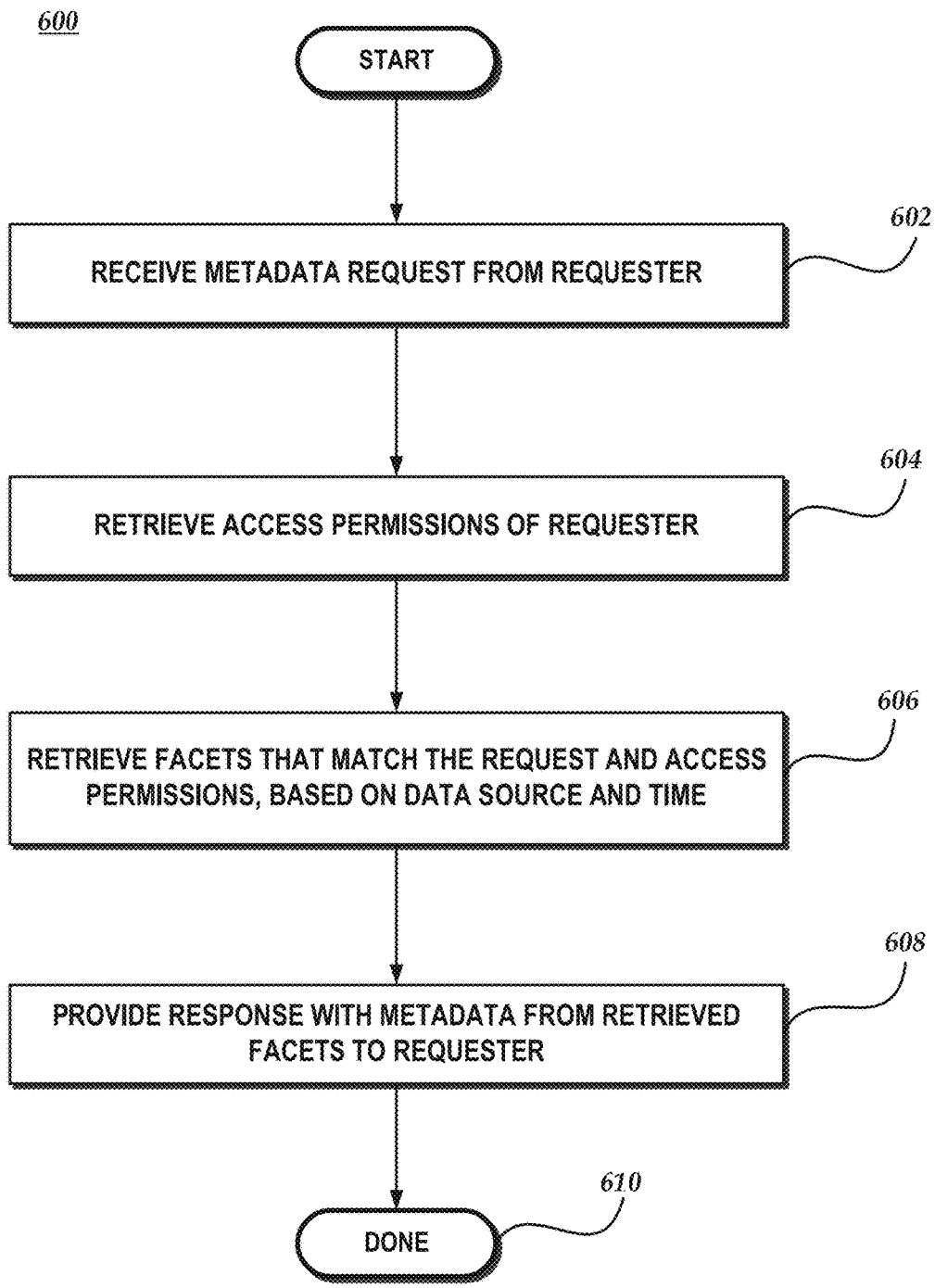
FIG. 6 is a flow diagram illustrating an example embodiment of a process of providing metadata facets to a requester.

FIG. 6 is a flow diagram illustrating an example embodiment of a process 600 of providing metadata. In one embodiment, at least some of the actions of process 600 are performed by components of computer subsystem 300 of FIG. 3.

The illustrated portions of process 600 may be initiated, after a start block, at block 602, where a request for metadata may be received from a requester, such as clients 114 or 116 of FIG. 3. The request may include a specification of a data object, a time frame, or other specifications.

The process may flow to block 604, where access permissions corresponding to the requester may be retrieved. As discussed herein, in one embodiment, access permissions may be retrieved from subscription registry 108.

The process may flow to block 606, where facets that match the request specifications and access permissions may be retrieved. The match may be determined based on a data source corresponding to each metadata facet, a time frame corresponding to each facet, or a combination thereof. In one implementation, the IAL service may determine an accessible set of sources based on the access permissions, exclude facets that have corresponding sources outside of the accessible set of sources, and retrieve facets that have corresponding sources within the accessible set of sources. The retrieved facets are referred to herein as a response set of facets. In one embodiment, an ACL corresponding to each facet may be used to determine the response set of facets for a query. The metadata of the response set of facets may be aggregated into a report or any type of structure or format. In one embodiment, duplicate items of metadata, such as an item of metadata that is received from multiple sources and is therefore stored in multiple facets, are removed.

The process may flow to block 608, where a response including the metadata of the retrieved facets may be provided to the requester. Responses 304, 308, and 312 are examples of such responses. The process may flow to block 610 and exit or return to a calling program.

Figure 7:
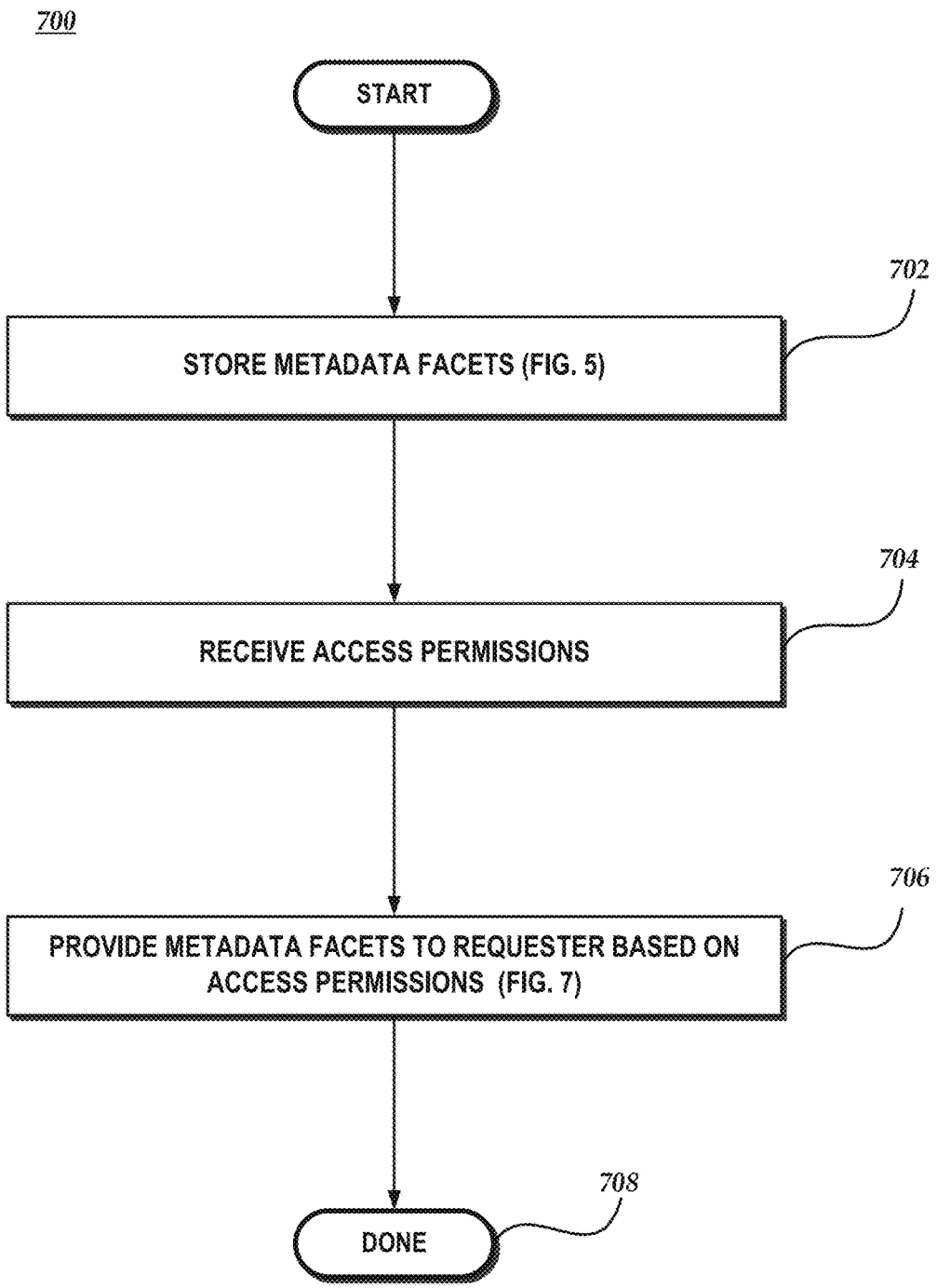
FIG. 7 is a flow diagram illustrating an example embodiment of a process of storing and providing metadata facets based on access permissions.

FIG. 7 is a flow diagram illustrating an example embodiment of a process 700 of storing and providing metadata facets based on access permissions. In one embodiment, at least some of the actions of process 700 are performed by components of computer subsystems 200 or 300 of FIGS. 2 and 3.

The illustrated portions of process 700 may be initiated, after a start block, at block 702, where metadata facets may be stored in a repository, such as facet repository 112 of FIG. 1. Process 500 of FIG. 5 provides an example process that may implement the actions of block 702, or a portion thereof.

The process may flow to block 704, where metadata access permissions may be received. The access permissions may indicate, for a specific client or class of clients, metadata that the clients have permission to receive. This may be based on a source of each metadata item, a time frame corresponding to each metadata item, or a combination thereof. The received metadata access permissions may be stored in a repository, such as subscription registry 108 of FIG. 1.

The process may flow to block 706, where metadata facets may be provided to a requester based on access permissions. Process 600 of FIG. 6 provides an example process that may implement the actions of block 706, or a portion thereof.

In one embodiment, IAL service 110 performs the actions of process 700, or a portion thereof. In one implementation, IAL service 110 may be conceptually or physically divided into a data storage processor that performs the actions of process 500 and a data provider processor that performs the actions of process 600. Reference may be made to each of these components herein, though they may be integrated to various degrees in various implementations.

Though the actions of process 700 may be performed in a variety of orders, in one embodiment, the actions of block 704, receiving access permissions, are performed after storing the metadata facets at block 702, though other access permissions may have previously been received. These access permissions may be the access permissions used at block 706 to determine a response set to a request for metadata. Thus, in this embodiment, the storing of the metadata facets is not based on the access permissions relating to a subsequent query. It is therefore not necessary to update the metadata in response to a new set of access permissions or a change in access permissions. In some embodiments, the access permissions used at block 706 may be received with the request for metadata. In one embodiment, in response to receiving the request for metadata, IAL service 110 may perform actions to retrieve access permissions from an external source.

In one example scenario, a set of metadata facets may be received and stored as discussed herein. Subsequently, access permissions for a new client class may be received. Though these permissions may differ from any already stored, an update of the metadata or rearrangement of the stored metadata facets is not needed. The newly received access permissions are used when processing a request, in block 706. A similar scenario may occur in the event that access permissions for a client class are modified after the metadata is received and stored.

In another example scenario, a user such as an administrator may employ process 700, or a portion thereof, to perform an impact analysis, such as determining an impact of modifying a column specification in a data table. Metadata associated with the column may be stored as facets as described herein. An administrator may perform a query, specifying the column as a data object. The system may determine metadata facets associated with the column, and in particular, metadata descriptive of dependencies on the column. The administrator may thus view an impact of modifying the column specification.

FIG. 8 shows one embodiment of a computing device 800, illustrating selected components of a computing device that may be used to implement subsystems 200 or 300, or perform functions described herein, including processes 500, 600, or 700. Computing device 800 may include many more components than those shown, or may include less than all of those illustrated. Some components may be implemented by multiple computing devices. Computing device 800 may be a standalone computing device or part of an integrated system, such as a blade in a chassis with one or more blades.

As illustrated, computing device 800 includes one or more processors 802, which perform actions to execute instructions of various computer programs. In one configuration, each processor 802 may include one or more central processing units, one or more processor cores, one or more ASICs, cache memory, or other hardware processing components and related program logic. As illustrated, computing device 800 includes an operating system 804. Operating system 804 may be a general purpose or special purpose operating system. The Windows® family of operating systems, by Microsoft Corporation, of Redmond, Wash., are examples of operating systems that may execute on computing device 800.

Memory and storage 806 may include one or more of a variety of types of non-transitory computer storage media, including volatile or non-volatile memory, RAM, ROM, solid-state memory, disk drives, optical storage, or any other medium that can be used to store digital information.

Memory and storage 806 may store one or more components described herein or other components. In one embodiment, memory and storage 806 stores the software components of subsystems 200 or 300, or a portion thereof. The illustrated example components are subscription registry 108, IAL service 110, and facet repository 112, though more or less components may be stored in memory and storage 806. Any one or more of these components may be moved to different locations in RAM, non-volatile memory, or between RAM and non-volatile memory by operating system 804 or other components.

Computing device 800 may include a video display adapter 812 that facilitates display of program code or other information to a user. Though not illustrated in FIG. 8, computing device 800 may include a basic input/output system (BIOS), and associated components. Computing device 800 may also include a network interface unit 810 for communicating with a network. Software components of subsystems 200 or 300 may be received via transitory media and network interface unit 810. Embodiments of computing device 800 may include one or more of a display monitor 814, keyboard, pointing device, audio component, microphone, voice recognition component, or other input/output mechanisms.

It will be understood that each block of the flowchart illustration of FIGS. 5-7, and combinations of blocks in the flowchart illustration, can be implemented by software instructions. These program instructions may be provided to a processor to produce a machine, such that the instructions, which execute on the processor, create means for implementing the actions specified in the flowchart block or blocks. The software instructions may be executed by a processor to provide steps for implementing the actions specified in the flowchart block or blocks. In addition, one or more blocks or combinations of blocks in the flowchart illustrations may also be performed concurrently with other blocks or combinations of blocks, or even in a different sequence than illustrated without departing from the scope or spirit of the invention.

The above specification, examples, and data provide a complete description of the manufacture and use of the composition of the invention. Since many embodiments of the invention can be made without departing from the spirit and scope of the invention, the invention resides in the claims hereinafter appended

What is claimed as new and desired to be protected by Letters Patent of the United States is:

1. A computer-based method of storing and providing metadata items corresponding to a plurality of data objects, the method comprising:

receiving, from each of a plurality of sources, a set of metadata items, each metadata item of the set of metadata items corresponding to one or more data objects of the plurality of data objects;

storing each metadata item as a facet in a repository, each facet in the repository having a corresponding access control list (ACL) that indicates which requestors are allowed to access the each facet; and tagging each facet with an identifier of a source corresponding to the facet, an identifier of a time frame corresponding to the facet, and a data object corresponding to the facet, wherein at least two facets corresponding to a data object have different corresponding time frames from each other.

2. The computer-based method of claim 1, further comprising in response to receiving a request for metadata, the request including a specification of a requested time frame representative of a time, prior to the request, that the metadata was received, retrieved, or extracted, providing first metadata stored as a facet corresponding to a time frame that matches the requested time frame, and not providing second metadata stored as a facet corresponding to a time frame that does not match the requested time frame.

3. The computer-based method of claim 1, further comprising in response to receiving a request for metadata from a requester, the request including a specification of a requested time frame representative of a time, prior to the request, that the metadata was received, retrieved, or extracted, selectively providing metadata to the requester based on whether access permissions corresponding to the requester indicate that the requester has permissions corresponding to the specified requested time frame.

4. The computer-based method of claim 1, retrieving the response set of facets comprising determining the response set of facets based on a source corresponding to each facet and access permissions of the requester corresponding to each of the sources.

5. The computer-based method of claim 1, storing each metadata item comprising storing a plurality of facets in the repository, the plurality of facets having a common corresponding data object, each of the plurality of facets having a corresponding data source different from other facets of the plurality of facets.

6. The computer-based method of claim 1, each metadata item descriptive of a corresponding data table or a data table column.

7. A computer-based method of providing metadata items corresponding to a plurality of data objects, the method comprising:

receiving, from a requester, a request for metadata, the request including a specification of a data object and a requested time frame representative of a time, prior to the request, that the metadata was received, retrieved, or extracted;

in response to receiving the request, retrieving first metadata from a repository, the first metadata stored as a facet corresponding to a first time frame that matches the requested time frame, the data object, and a corresponding data source; and in response to receiving the request, selectively providing the retrieved first metadata to the requester based on whether access permissions corresponding to the requester indicate that the requester has permissions corresponding to the specified time frame and data source, and not providing second metadata stored as a facet corresponding to a second time frame that does not match the requested time frame.

8. The computer-based method of claim 7, selectively providing the requested metadata comprising determining a response set of facets based on a source corresponding to each facet and access permissions of the requester corresponding to each of the sources.

9. A computer-based method of modifying a data table comprising:

sending the request for metadata, the request specifying a table column as a data object;

employing the method of claim 7 to provide the requested metadata; and determining an impact of modifying a specification of the data table column based on the provided metadata.

10. The computer-based method of claim 7, the request for metadata comprising a request for metadata corresponding to a data table or a portion thereof, the method further comprising providing metadata from a first server for which the requester has access permissions and not providing metadata from a second server for which the requester does not have access permissions.

11. A computer-based system for storing and providing a plurality of metadata items corresponding to a plurality of data objects, the system comprising:

a metadata facet repository that stores each of the plurality of metadata items as a corresponding metadata facet tagged with identification of a corresponding data object, source, and time frame, the metadata facets including a first metadata facet having a corresponding data object, a first source, and a first time frame, a second metadata facet corresponding to the data object, the first source and a second time frame different from the first time frame, and a third metadata facet corresponding to the data object, the first time frame, and a second source different from the first source, the metadata facet repository maintaining an access control list (ACL) to determine a response set of metadata facets corresponding to a query;

a data storage processor that receives a set of metadata items from each of a plurality of sources and stores each metadata item as a facet in the metadata facet repository; and a data provider processor that receives, from a requester, a request for metadata, the request including a specification of the data object, the first source and the first time frame, and in response to receiving the request, retrieves a response set of facets based on the specification of the data object, the first source and the first time frame, the response set including the first metadata facet and excluding the second metadata facet and the third metadata facet.

12. The computer-based system of claim 11, each of the first time frame and the second time frame representative of a time when a corresponding source received a corresponding metadata item.

13. The computer-based system of claim 11, further comprising an access permissions repository that stores information representing permission to access metadata facets having specified sources and time frames.

14. The computer-based system of claim 11, the data object corresponding to a server, at least one metadata facet representing a dependency of the server, the request including a specification of the server.

* * * * *